United States Patent
Whitacre et al.

(10) Patent No.: US 12,281,563 B2
(45) Date of Patent: Apr. 22, 2025

(54) IN-SITU DOWNHOLE MEASUREMENT CORRECTION AND CONTROL

(71) Applicant: Scientific Drilling International, Inc., Houston, TX (US)

(72) Inventors: Timothy Whitacre, Paso Robles, CA (US); Matthew A. White, Templeton, CA (US); Pong Pipatwit, Templeton, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 45 days.

(21) Appl. No.: 18/200,462

(22) Filed: May 22, 2023

(65) Prior Publication Data

US 2023/0296012 A1   Sep. 21, 2023

Related U.S. Application Data

(63) Continuation of application No. 17/129,535, filed on Dec. 21, 2020, now Pat. No. 11,697,987, which is a continuation of application No. 16/416,185, filed on May 18, 2019, now Pat. No. 10,895,143.

(60) Provisional application No. 62/673,320, filed on May 18, 2018.

(51) Int. Cl.
  *G01V 3/26* (2006.01)
  *E21B 7/06* (2006.01)
  *E21B 44/00* (2006.01)
  *E21B 47/024* (2006.01)
  *G01V 3/38* (2006.01)

(52) U.S. Cl.
  CPC .............. *E21B 44/005* (2013.01); *E21B 7/06* (2013.01); *E21B 47/024* (2013.01); *G01V 3/26* (2013.01); *G01V 3/38* (2013.01)

(58) Field of Classification Search
  CPC ........ E21B 44/005; E21B 7/06; E21B 47/024; G01V 3/26; G01V 3/38
  See application file for complete search history.

(56) References Cited

FOREIGN PATENT DOCUMENTS

GB           2498831 A  *  7/2013  ............. E21B 44/00

* cited by examiner

*Primary Examiner* — Mohamed Charioui
*Assistant Examiner* — Xiuqin Sun
(74) *Attorney, Agent, or Firm* — Ewings & Jones, PLLC

(57) ABSTRACT

A method includes providing a Bottom Hole Assembly (BHA) in a wellbore. The BHA includes a rotary steerable system and a downhole attitude correction and control system. The downhole correction and control system includes a first sensor set, the sensors of the first sensor set positioned near ferromagnetic components of a drill string and a second sensor set, the sensors of the second sensor set positioned further from the ferromagnetic components of the drill string than the sensors of the first sensor set. Corrupted data from the first sensor set and reference data from the second sensor set is obtained, the corrupted data including cross-axis magnetometer and accelerometer measurements. The method additionally includes correcting the corrupted sensor data to form corrected sensor measurements and calculating an estimated azimuth from the corrected sensor measurements. The method further includes steering the rotary steerable system based on the estimated azimuth.

3 Claims, 6 Drawing Sheets ent Ser. No. 17/129,535 filed Dec. 21, 2020, which is a continuation application of U.S. non-provisional application Ser. No. 16/416,185 filed May 18, 2019, which claims priority from U.S. provisional application No. 62/673,320, filed May 18, 2018, each of which is incorporated by reference herein in its entirety.

TECHNICAL FIELD/FIELD OF THE DISCLOSURE

The present disclosure relates to the establishment of orientation and control of a downhole tool.

BACKGROUND OF THE DISCLOSURE

Knowledge of wellbore position is useful for the development of subsurface oil & gas deposits. Accurate knowledge of the position of a wellbore at a measured depth, including inclination and azimuth of the wellbore, may be used to determine the geometric target location of, for example, a hydrocarbon bearing formation of interest. Additionally, directional borehole drilling typically relies on one or more directional devices such as bent subs and rotary steering systems to direct the course of the wellbore. The angle between the reference direction of the directional device and an external reference direction is referred to as the toolface angle, and may determine the direction of deviation of the wellbore as the wellbore is drilled. During directional drilling, the placement of the borehole is typically compared with the desired path, and a toolface angle and other drilling parameters are selected to advance the borehole and correct the wellbore towards the desired path. Measurement of toolface, inclination and azimuth thus may be a component for borehole steering and placement. Additionally, when a steerable system such as a rotary steering system is used down-hole to direct the wellbore towards the desired path, changes in the selected toolface angle are typically sent from the surface to the down-hole system by downlinking and sending an encoded message via one or more telemetry channels, such as wired pipe, mud pump rate modulation, bypass of some of the drilling fluid through a bypass valve, drill string rotation modulation, or electromagnetic excitation of the drill string and surrounding formation. These downlink methods typically take a significant amount of time and may disrupt drilling of the wellbore.

Downhole sensors, such as downhole sensors for measurement while drilling (MWD), logging while drilling (LWD) and other measurement methods may be used for determining wellbore position. Certain sensors may be affected by downhole conditions or by the operation or proximate location of other components of the drill string. For example, magnetometers may be affected by ferromagnetic components of the drill string such as a drill bit. Traditionally, such interactions may limit the locations at which downhole sensors may be positioned along the drill string or prevent the downhole sensors from being placed at a preferred location nearer to the drill bit.

SUMMARY

The present disclosure includes a method. The method includes providing a Bottom Hole Assembly (BHA) positioned in a wellbore. The BHA includes a rotary steerable system and a downhole attitude correction and control system. The downhole correction and control system includes a first sensor set having sensors, the sensors of the first sensor set positioned near ferromagnetic components of a drill string and a second sensor set having sensors, the sensors of the second sensor set positioned further from the ferromagnetic components of the drill string than the sensors of the first sensor set. The downhole correction and control system also includes a RSS controller, the RSS controller operatively coupled to and adapted to receive measurements from the first and second sensor sets, the controller in data communication with the rotary steerable system. The method also includes obtaining corrupted data from the first sensor set and reference data from the second sensor set, the corrupted data including along-hole and cross-axis magnetometer and accelerometer measurements. In addition, the method includes depth aligning the corrupted sensor data and the reference data and calculating twist misalignment between the cross-axis magnetometer and accelerometer measurements of the corrupted sensor data to obtain a bias estimate. The method further includes calculating an estimated z axis magnetic scale factor and bias of the first sensor set and calculating a cross-axis magnetic scale factor of the corrupted sensor data. The method additionally includes correcting the corrupted sensor data to form corrected sensor measurements and calculating an estimated azimuth from the corrected sensor measurements. The method further includes steering the rotary steerable system based on the estimated azimuth.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
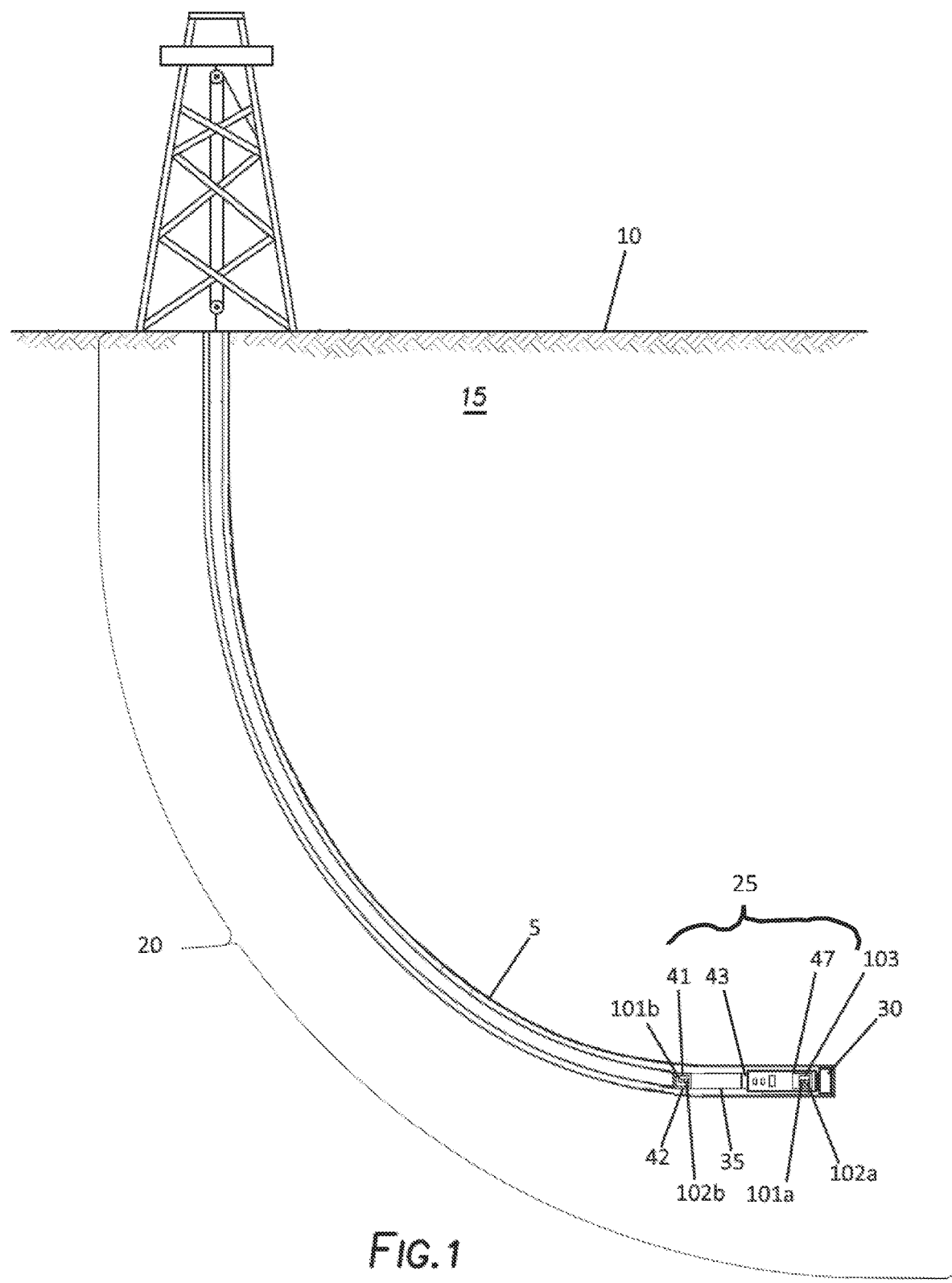
FIG. 1 depicts an overview of a drilling operation utilizing a drill string incorporating downhole sensors consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting.

In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an overview of a drilling operation in which wellbore 5 is formed from surface 10 into formation 15 using drill string 20. Drill string 20 may be made up of multiple tubular members coupled end-to-end to extend into wellbore 5. Drill string 20 may include bottom hole assembly (BHA) 25 positioned at a lower end of drill string 20. BHA 25 may include one or more downhole tools used for forming or measuring one or more aspects of wellbore 5 and formation 15 while BHA 25 is positioned in wellbore 5. In some embodiments, for example and without limitation, BHA 25 may include drill bit 30 used to form wellbore 5. In some embodiments, BHA 25 may include downhole motor 35. Downhole motor 35 may be used to rotate drill bit 30 during certain drilling operations such as sliding mode drilling operations. Downhole motor 35 may, for example and without limitation, be a mud motor, turbine motor, or electric motor. In some embodiments, BHA 25 may include one or more sensor packages including, for example and without limitation, azimuthal gamma tool 39. In some embodiments, BHA 25 may include survey tool 41. Survey tool 41 may be positioned at a distance from drill bit 30 on BHA 25. In some embodiments, survey tool 41 may include one or more sensors and controllers, as discussed further below, and may include non-magnetic components such as, for example and without limitation, non-magnetic housing 42. In some embodiments, BHA 25 may include one or more telemetry systems for communicating with surface equipment. In some such embodiments, BHA 25 may include mud pulser 43. In some embodiments, BHA 25 may include one or more power supplies 44, which may include batteries for providing electric power to components of BHA 25. In some embodiments, BHA 25 may include a steering system for guiding the formation of wellbore 5 including, for example and without limitation, rotary steerable system (RSS) 45. RSS 45 may be used for a directional drilling operation. In some embodiments, RSS 45 may include one or more steering members such as pads 50, which may be used to exert a force against wellbore 5 to alter the direction of propagation of wellbore 5. In such an embodiment, the direction in which RSS 45 steers the propagation of wellbore 5 is referred to as the toolface of RSS 45. In some embodiments, RSS 45 may include non-rotating sleeve 55 positioned about a rotating portion of RSS 45. Non-rotating sleeve 55 may be positioned such that while drill string 20 is rotated, non-rotating sleeve 55 does not rotate or rotates at a slow rate relative to wellbore 5. In some embodiments, RSS 45 may include turbine generator 46 to, for example and without limitation, provide electric power to RSS 45. In some embodiments, RSS 45 may include RSS sensor package 47. RSS sensor package 47 may include one or more sensors and controllers as discussed further herein below.

Figure 2:
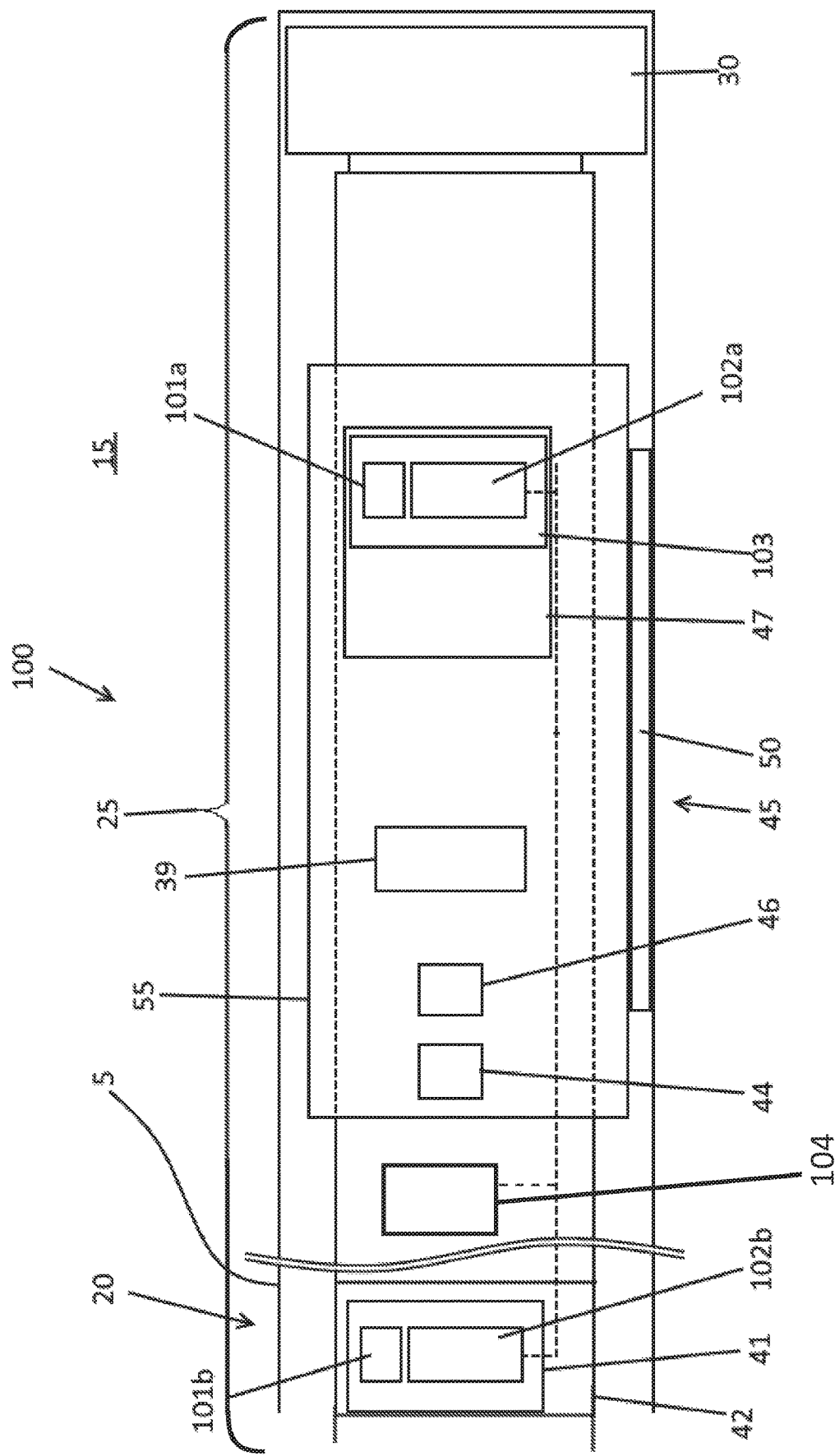
FIG. 2 depicts a drill string consistent with at least one embodiment of the present disclosure positioned in a wellbore.

In some embodiments, drill string 20 may include downhole attitude correction and control system 100. Downhole attitude correction and control system 100 may include two or more sensor sets positioned at different locations along drill string 20, referred to herein as first sensor set 101a and second sensor set 101b. Although described with respect to two sensor sets, the methods described in the present application may be applied to any number of sensor sets. In some embodiments, each of first sensor set 101a and second sensor set 101b may include one or more accelerometers and magnetometers such as triaxial accelerometers and triaxial magnetometers. In some embodiments, each of first sensor set 101a and second sensor set 101b may include additional sensors including, for example and without limitation, gyroscopes. In some embodiments, first sensor set 101a may be positioned at a location along drill string 20 such that the readings of one or more sensors of first sensor set 101a are interfered with by components of drill string 20 such as drill bit 30. For example, in some embodiments, first sensor set 101a may be part of RSS sensor package 47. Second sensor set 101b may be positioned at a location along drill string 20 at which the readings of second sensor set 101b are not expected to be affected by other components of drill string 20. For example, in some embodiments, second sensor set 101b may be part of survey tool 41. In some such embodiments, first sensor set 101a may be positioned nearer to ferromagnetic components of drill string 20 such as, for example and without limitation, drill bit 30, RSS 45, pads 50, non-rotating sleeve 55, turbine generator 46, or other components of BHA 25 than second sensor set 101b. Such sources of interference may include hard and soft iron components that may cause apparent bias and scale factor errors for a magnetometer of first sensor set 101a positioned nearby. Second sensor set 101b may, in such an embodiment, be placed at a location on drill string 20 further uphole where less magnetic interference from components of drill string 20 is expected as shown in FIGS. 1 and 2. In some embodiments, as discussed above, survey tool 41 may be positioned in non-magnetic housing 42. In some embodiments, first sensor set 101a and second sensor set 101b may be positioned at a known separation distance apart along drill string 20 and may be aligned within a known maximum bend angle, defined as the angle between the along-hole axis of wellbore 5 at first sensor set 101a and the along-hole axis of wellbore 5 at second sensor set 101b. As discussed further below, the twist angle between first sensor set 101a and second sensor set 101b, defined as the angle about the along-hole axis of wellbore 5 between first sensor set 101a and second sensor set 101b, may not need to be known and may change.

Figure 3:
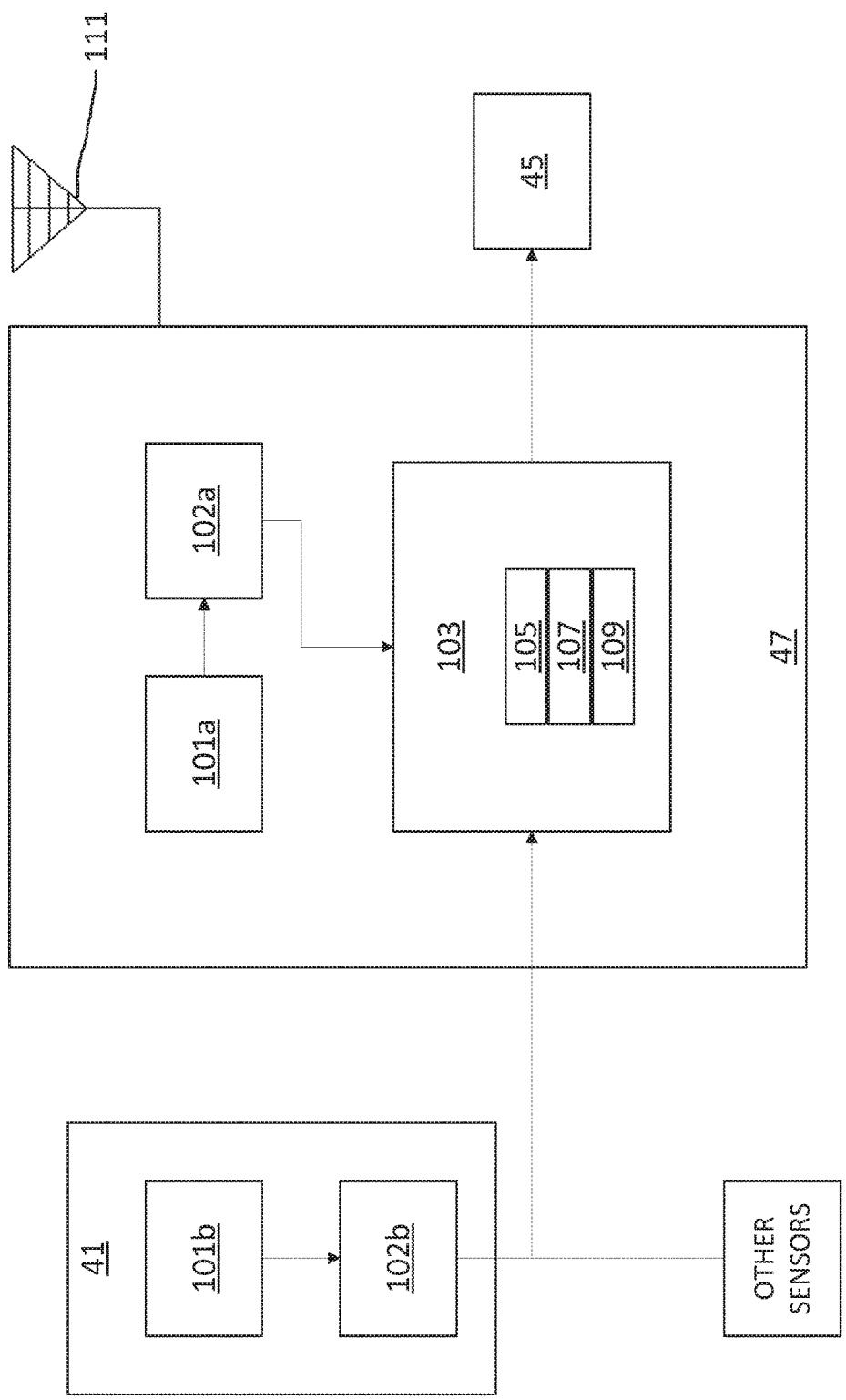
FIG. 3 depicts a schematic view of a downhole attitude correction and control system consistent with at least one embodiment of the present disclosure.

In some embodiments, each of first sensor set 101a and second sensor set 101b may be connected to a corresponding first sensor controller 102a and second sensor controller 102b. In some embodiments, first sensor controller 102a may be part of RSS sensor package 47 and second sensor controller 102b may be part of survey tool 41. First sensor controller 102a and second sensor controller 102b may, among other operations, take and record measurements from the respective first sensor set 101a and second sensor set 101b. In some embodiments, downhole attitude correction and control system 100 may include RSS controller 103 included with drill string 20. In some embodiments, RSS controller 103 may be part of RSS 45 and may include first sensor set 101a. In some embodiments, downhole attitude correction and control system 100 may include MP controller 104. MP controller 104 may periodically request and receive measurements of second sensor set 101b from survey tool 41. MP controller 104 may then transfer the measurements of second sensor set 101b to RSS controller 103. Each of first sensor controller 102a, second sensor controller 102b, RSS controller 103, and MP controller 104 may be interconnected, such as by a data bus and therefore able to communicate measurements, instructions, and other data between the controllers. For the purposes of this disclosure, RSS controller 103 is described; however operations described herein below may be distributed between one or more additional controllers. In some embodiments, as depicted in FIG. 3, RSS controller 103 may be operatively coupled to and adapted to receive measurements from first sensor set 101a and second sensor set 101b. In some embodiments, RSS controller 103 may include processor 105 adapted to perform computer program instructions according to methods including those described herein below. In some embodiments, processor 105 may be, for example and without limitation, a microprocessor, microcontroller, digital signal processor, ASIC, FPGA, or CPLD. In some embodiments, RSS controller 103 may include storage memory 107 that may be used to, for example and without limitation, store measurements received from first sensor set 101a and second sensor set 101b as well as any other information provided to RSS controller 103. In some embodiments, RSS controller 103 may include one or more communications systems 109 to allow communication between RSS controller 103 and other components of drill string 20 such as survey tool 41, first sensor controller 102a, and second sensor controller 102b, or other systems positioned at the surface through telemetry apparatus 111. Communication systems 109 may include, for example and without limitation, one or more of wired communication, wireless electromagnetic communication, or wireless acoustic communication systems. In some embodiments, RSS controller 103 may be adapted to communicate with or control RSS 45. In such an embodiment, RSS controller 103 may provide instructions to RSS 45 to, for example and without limitation, control the direction of drilling of wellbore 5 by drill string 20 during a drilling operation.

In some embodiments, RSS controller 103 may include instructions on a non-transitory computer-readable media to process the measurements received from first sensor set 101a and second sensor set 101b to determine the orientation of BHA 25 within wellbore 5 including, for example and without limitation, the inclination, azimuth, and toolface of drill string 20 within wellbore 5. In some embodiments, first sensor controller 102a may take measurements from first sensor set 101a and second sensor controller 102b may take measurements from second sensor set 101b within wellbore 5 as drill string 20 is moved within wellbore 5, such as during a drilling operation. In some embodiments, measurements may be taken while drill string 20 is moving within wellbore 5. The measurements may be received and stored by RSS controller 103. Because first sensor set 101a and second sensor set 101b are spaced apart along drill string 20, the measurements of first sensor set 101a and second sensor set 101b may make measurements at the same point along wellbore 5 at different times. However, because first sensor set 101a is positioned proximate a source of interference on drill string 20, the measurements made by first sensor set 101a may be less accurate than the measurements made by second sensor set 101b.

In some embodiments, RSS controller 103 may combine measurements from first sensor set 101a and second sensor set 101b to, for example and without limitation, estimate measurement errors on the measurements from first sensor set 101a, second sensor set 101b, or both. In some such embodiments, the measurements may be corrected for the identified measurement errors and may be used to estimate the orientation of BHA 25 including, for example and without limitation, the attitude including the inclination and azimuth of RSS 45.

Figure 4:
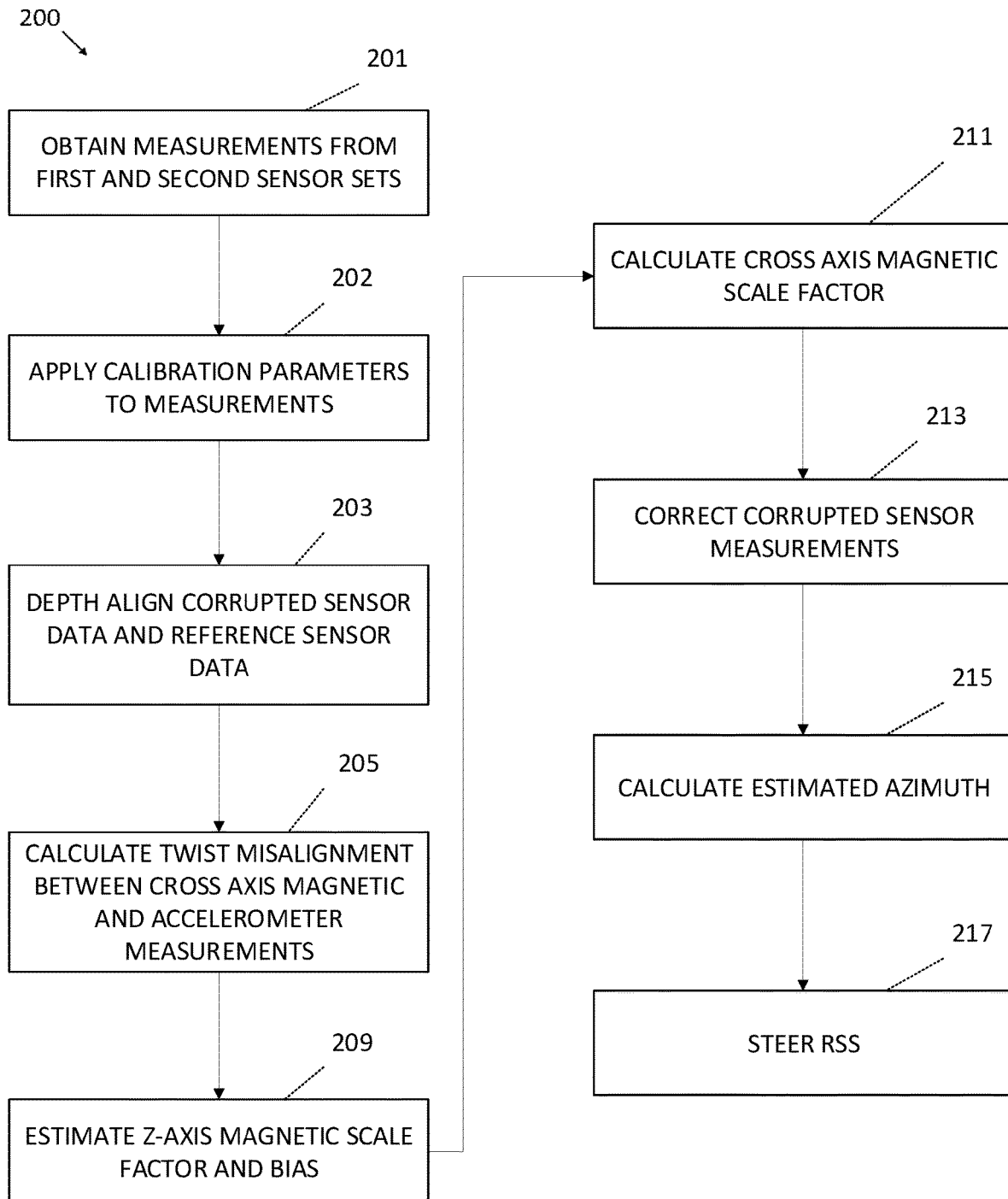
FIG. 4 depicts a process flow diagram of an attitude correction operation consistent with at least one embodiment of the present disclosure.

FIG. 4 depicts a process flow diagram of a downhole measurement correction and control operation 200 consistent with at least one non-limiting embodiment of the present disclosure. In FIG. 4, first sensor set 101a and second sensor set 101b each includes sensors to measure cross axis and Z-axis (aligned with the longitudinal axis of drill string 20) components of the magnetic and gravitation fields. Different embodiments of the present disclosure may make use of different sensors to accomplish these measurements. For example and without limitation, in some embodiments, a z-axis gyro and a canted magnetometer and accelerometer could estimate these fields. In other embodiments, each of first sensor set 101a and second sensor set 101b may include two magnetometers oriented such that the sensitive axes are substantially not parallel and two accelerometers oriented such that the sensitive axes are substantially not parallel. In other embodiments, each of first sensor set 101a and second sensor set 101b may include at least one magnetometer aligned with the longitudinal axis of drill string 20 (Z-axis magnetometer), at least one magnetometer aligned substantially perpendicular to the longitudinal axis of drill string 20 (cross-axis magnetometer), an accelerometer aligned with the longitudinal axis of drill string 20 (Z-axis accelerometer), and at least one accelerometer aligned substantially perpendicular to the longitudinal axis of drill string 20 (cross-axis accelerometer).

In some embodiments, downhole measurement correction and control operation 200 may include obtaining measurements from first sensor set 101a and second sensor set 101b (201). In some embodiments, the sensors of first sensor set 101a and second sensor set 101b may be sampled while drill string 20 is moving within wellbore 5, including during rotation and longitudinal translation during a drilling operation. In certain embodiments, first sensor set 101a and second sensor set 101b may be sampled while drill string 20 is rotating or not rotating and while drill string 20 is at constant depth or while changing in depth. In some embodiments, sensors of first sensor set 101a and second sensor set 101b may be sampled at, for example and without limitation, between 50 Hz and 1 KHz. In some embodiments, one or more controllers such as first sensor controller 102a and second sensor controller 102b may initially correct the measurements by applying calibration parameters to the sensor readings (202). For example, in some embodiments, calibrated scale factors, bias, and misalignments may be applied to the respective sensor readings. Such calibrated scale factors, biases, and misalignments may be determined by calibration experimentation undertaken before first sensor set 101a and second sensor set 101b are used in wellbore 5. In some embodiments, such calibrated scale factors, biases, and misalignments may be determined in-situ. In some embodiments, a combination of calibration parameters determined prior to sensor sets 101a and 101b being in the wellbore and calibration parameters identified in-situ, may be used to correct the measurements. In some embodiments, where the measurements are obtained during rotation of drill string 20, accelerometer and magnetometer readings may be phase aligned to, for example and without limitation, reduce or remove phase error of the magnetometer readings due to eddy-current effects caused by conductive materials of drill string 20 rotating in the earth's magnetic field. In some embodiments, magnetic interference may likewise be subtracted from the magnetometer readings due to experimentally determined interference of non-rotating sleeve 55 or RSS 45. In some embodiments, such magnetic interference may be determined in-situ. In some embodiments, one or more sensors may be used to determine the relative orientation between first sensor set 101a and non-rotating sleeve 55 such as an encoder or tick-sensor. As discussed above, the measurements may then be received by RSS controller 103. In some embodiments, second sensor controller 102b may perform fewer operations than first sensor controller 102a. In some such embodiments, second sensor controller 102b may correct scale factor bias and misalignment, and may provide an average of the corrected samples to RSS controller 103. In some embodiments, RSS controller 103 may perform one or more of these operations.

In some embodiments, the in-situ determination of magnetic interference due to non-rotating sleeve 55, utilizes measurements of the corrupted magnetic field sensed by sensor set 101$a$ as well as the relative orientation of non-rotating sleeve 55. Variations in the cross axis and along axis field that are synchronous with the rotation of non-rotating sleeve 55 can be identified using the method described in U.S. patent application Ser. No. 15/676,463, the entirety of which is hereby incorporated by reference. The synchronous variations in the magnitude of the cross axis magnetic field, the total magnetic field, as well as the individual components of the magnetic field, sensed by sensor set 101$a$, can be used to estimate the magnetic interference when the actual inclination and azimuth of sensor set 101$a$ is varying. In some embodiments, estimations of the inclination and azimuth of sensor set 101$a$ can be utilized to help separate out the variations that are due to the magnetic interference of non-rotating sleeve 55 from the variations that occur due to changes in orientation of sensor set 101$a$.

In some embodiments, a state estimator, such as a Kalman Filter, may be utilized for estimating the magnetic interference that is due to non-rotating sleeve 55. Using the methods described in U.S. patent application Ser. No. 15/676,463, rotating measurements from sensor set 101$a$ may be processed to obtain estimates of the magnetic field components in a different frame of reference. The orientation of non-rotating sleeve 55 may also be calculated in this same frame of reference. In some embodiments, one of the axes, herein called the Z axis, of said frame of reference is aligned with the nominal rotational axis of sensor set 101$a$, which is typically the same, or nearly the same rotational axis of non-rotating sleeve 55 as well as the along direction of the proximate wellbore. In some embodiments, the magnetic field components sensed by sensor set 101$a$ due to the magnetic interference of non-rotating sleeve 55 can thus be modelled as a function of the angle $\theta$ of non-rotating sleeve 55 about this Z axis. In some embodiments, the modelling function for the cross-axis magnetic interference may be sinusoidal:

$$B_{INT} = I^* \cos(\theta) Q^* \sin(-\theta)$$

Where I and Q are the portion of the interference aligned with the X and Y axes respectively. The magnetic field components sensed by sensor set 101$a$ are a combination of non-rotating sleeve 55 magnetic interference components, earth's magnetic field components, and other magnetic interference components that are not of interest. The cross axis magnetic field components sensed by sensor set 101$a$ can thus be modeled as:

$$B_I = I^* \cos(\theta) + B_{cross}^* \cos(\theta_{MTF}) + \eta_I$$

$$B_Q = Q^* \sin(-\theta) + B_{cross}^* \sin(-\theta_{MTF}) + \eta_Q$$

Where $\eta_I$ and $\eta_Q$ are the magnetic interference components and noise that are not of interest, and $\theta_{MTF}$ is the magnetic toolface of the frame of reference, which is the negative rotation angle of the frame of reference about the Z axis that would cause the X axis to align with the cross-axis projection of earth's magnetic field vector. In some embodiments, the state to be estimated by the state estimator may be:

$$x = \begin{bmatrix} I \\ Q \\ I_{bias} \\ Q_{bias} \end{bmatrix}$$

where $I_{bias}$ and $Q_{bias}$ are intended to track the combination of the earth's magnetic field and the bias of the magnetometer sensors of sensor set 101$a$ that are present in the cross axis components.

In some embodiments in which a Kalman Filter is used as the state estimator, the measurement model may be:

$$H = \begin{bmatrix} 1 & 0 & 1 & 0 \\ 0 & 1 & 0 & 1 \end{bmatrix}$$

Resulting in measurements of the true state:

$$z_k = H\widehat{x_k} + \eta = \begin{bmatrix} B_I \\ B_Q \end{bmatrix}$$

where $\widehat{x_k}$ is the true state and $\eta$ is measurement noise. In some embodiments, upon obtaining a new measurement of $\theta$, a Kalman state transition matrix is calculated so as to propagated forward the I and Q estimates:

$$\begin{bmatrix} I \\ Q \\ I_{bias} \\ Q_{bias} \end{bmatrix}_k = \begin{bmatrix} \cos(\theta_k - \theta_{k-1}) & -\sin(\theta_k - \theta_{k-1}) & 0 & 0 \\ \sin(\theta_k - \theta_{k-1}) & \cos(\theta_k - \theta_{k-1}) & 0 & 0 \\ 0 & 0 & 1 & 0 \\ 0 & 0 & 0 & 1 \end{bmatrix} \begin{bmatrix} I \\ Q \\ I_{bias} \\ Q_{bias} \end{bmatrix}_{k-1}$$

Where the subscript k corresponds to the sample number. In some embodiments, the Kalman Filter correction, as well as growth of the error covariance matrix, may not be performed for each new measurement $\theta$, but only when the new $\theta$ is sufficiently different from the value of $\theta$ that was used for the prior correction. Other criteria may also be used to determine when to perform the correction step and growth of the error covariance matrix, such as whether or not the new $\theta$ measurement is deemed an outlier based on estimations of rotation rate and uncertainty of rotation rate of non-rotating sleeve 55. In some embodiments, estimations of the change in inclination and azimuth may also be used to update the state estimates of $I_{bias}$ and $Q_{bias}$. Such estimations of inclination and azimuth may be performed separately, as additional states in the same state estimator, or as calculations based on additional states in the same estimator, as would be obvious to those skilled in the art. The estimates of I and Q may then be used to subtract out the magnetic interference from the estimates of the cross axis components of the magnetic field sensed by sensor set 101$a$, and corrected estimations of Mtf can be made. In some embodiments, similar estimations and corrections can be made for the Z axis magnetic interference that varies as a function of $\theta$.

In some embodiments, RSS controller 103 may periodically calculate a difference (delta) between magnetic and gravity toolfaces (Mtf–HsTF), cross-axis acceleration (Across), Z-axis acceleration (Az), cross-axis magnetic field (Bcross), z-axis magnetic field (Bz), and inclination of drill string 20 at the locations of wellbore 5 at which first sensor set 101$a$ and second sensor set 101$b$ are located based on the respective measurements of first sensor set 101$a$ and second sensor set 101b. In some embodiments, inclination may be calculated as the four-quadrant inverse tangent of Across and Az according to:

$$Inc = a\tan 2(Across, -Az)$$

In some embodiments, the attitude may be determined at, for example and without limitation, once per second. Such an attitude determination may be undertaken according to the methods described by U.S. patent application Ser. No. 15/676,463, the entirety of which is hereby incorporated by reference in its entirety.

In some embodiments, RSS controller 103 may calculate at predetermined intervals a sliding average and variance of MTF-HsTF, Across, Az, Bcross, Bz, and inclination for the measurements of first sensor set 101a or for each of the measurements of first sensor set 101a and second sensor set 101b. A sliding or windowed average calculation may be computed as the sum of samples divided by the number of samples taken over the specified time period. Likewise, a sliding or windowed variance may be computed by calculating the variance of the samples taken over the specified time period. These computations may be performed incrementally rather than re-calculated at each new sample or by use of infinite impulse response filters or other iterative techniques to reduce computational and or memory requirements on the processing system used to perform the calculations, i.e. RSS controller 103. In some embodiments, the sliding averages and variances may be calculated, for example and without limitation, across a time period between 1 second and 30 seconds. In some embodiments, the sliding averages and variances may be computed once per second.

In some embodiments, RSS controller 103 may calculate at predetermined intervals a mean of the calculated sliding averages and sum of squares of the calculated sliding averages of the measurements from first sensor set 101a and second sensor set 101b. In some embodiments, the means and sums of squares may be calculated once a minute. In some embodiments, the means and sums of squares may be stored in data buffers for the measurements of first sensor set 101a and the measurements of second sensor set 101b in storage memory 107. For the purposes of this disclosure, the data associated with the means and sums of squares of first sensor set 101a defines corrupted sensor data and the data associated with the means and sums of squares of second sensor set 101b defines a reference sensor data. In some embodiments, depending on the amount of storage space available, RSS controller 103 may store sensor data buffers corresponding to thirty minutes of data.

In some embodiments, RSS controller 103 may depth align the corrupted sensor data and reference sensor data (203). Because first sensor set 101a and second sensor set 101b are separated by an along-hole distance, the samples in time may be time shifted for the same depths as drill string 20 moves through wellbore 5. The data buffers are depth aligned such that measurements of the corrupted sensor data buffer and reference sensor data buffer are aligned with respect to the position within wellbore 5 represented by the data of the data buffers, such that the reference sensor data buffer is taken at the same depth and same attitude as the corresponding measurement of the corrupted sensor data buffer taken at the same depth and same attitude.

In some embodiments, the corrupted sensor data buffer and reference sensor data buffer may be depth aligned by searching for matching measurements or patterns in the measurements taken by first sensor set 101a and second sensor set 101b. In some embodiments, inclination may be used to depth align the data buffers. In some embodiments, measurements taken by other sensors of first sensor set 101a and second sensor set 101b including, for example and without limitation, gamma readings, sonic readings, or resistivity, may be used to depth align the data buffers. In some embodiments, one or more such measurements may be used in combination to depth align the data buffers.

In some embodiments, first sensor set 101a and second sensor set 101b may not be sampled simultaneously, at the same sample rate, or at the same sample intervals, and may be sampled, processed, and averaged by separate computing systems of RSS controller 103. In such an embodiment, RSS controller 103 may interpolate samples of first sensor set 101a and second sensor set 101b when depth aligning the data buffers. Such interpolation may be used whenever the depth alignment resolution between the samples of first sensor set 101a and second sensor set 101b is insufficient with the effective sample rate of the data being used for depth alignment.

In some embodiments, such as where there is insufficient change in the measurements of first sensor set 101a and second sensor set 101b to allow reliable pattern matching between the data buffers, a nominal time lag based on expected rate of penetration (ROP) may be used to depth align the measurements. Such an embodiment may be used, for example and without limitation, where wellbore 5 is straight or near straight and the attitude of first sensor set 101a and second sensor set 101b are substantially the same.

In some embodiments, RSS controller 103 may identify and calculate any twist misalignment between the cross-axis magnetometer and accelerometer measurements of the corrupted sensor data using the reference sensor data (205). In some such embodiments, the twist misalignment may be calculated as the difference between the reference and corrupted sensor data Mtf-HsTF according to:

$$\text{deltaMtfHtfbiasEstimate} = \text{deltaMtfHtfbiasEstimate} * (1 - \text{wtAdaptDeltaMtfHtf}) + \text{wtAdaptDeltaMtfHtf} * ((\text{Mtf}_{corrupted} - \text{HsTF}_{corrupted}) - (\text{Mtf}_{reference} - \text{HsTF}_{reference}))$$

RSS controller 103 may then calculate the adaptation weighting to be applied to deltaMtfHtfbiasEstimate. In some embodiments, an adaptive infinite impulse response (IIR) filter may be used. In some embodiments, the adaptation weighting may be calculated based on one or more of the inclination of the reference sensor data, the inclination difference between the reference sensor data and the corrupted sensor data, the angle between the Z-axis of drill string 20 and the magnetic field vector of the Earth (Bangle), and the difference between Bz readings of the reference sensor data and corrupted sensor data. The adaptation weighting may, for example and without limitation, set the adaptation speed of downhole measurement correction and control operation 200. In some embodiments, the adaption weighting may be calculated according to:

$$\text{wtAdaptDeltaMtfHtf} = \max(0, \min(1, \text{AdaptScalar} * \text{wtRefinc} * \text{wtBangle} * \text{wtDeltaInc} * \text{wtDeltaBz}))$$

Where incDiffNormFactor=3.0 (reasonable values depend on the possible physical bend between the reference sensor set and the corrupted sensor set); bzDiffNormFactor=1000.0 nanoTesla (reasonable values would be 100 nT up to 5000 nT); AdaptScalar=1.0 (this is a configurable parameter, but 1.0 is a reasonable value, however any positive value could be used); wtRefInc=sin(reference sensor data inclination); wtBangle=sin(bAngle); wtDeltaInc=1-min(1, abs(reference sensor data inclination−corrupted sensor data inclination)+

(standard deviation of corrupted sensor data inclination))/incDiffNormFactor); and wtDeltaBz=1-min(1, abs(ref Bz-(corrected Bz from corrupted sensor data))/bzDiffNormFactor.

In some embodiments, RSS controller 103 may update one or both of the estimated z axis magnetic scale factor and bias of first sensor set 101a (209). In some embodiments, both estimated z axis magnetic scale factor and bias of first sensor set 101a may be updated when drill string 20 has changed attitude, such as where the Bz of the reference sensor data and the Bz of the corrupted sensor data are sufficiently different from the mean of the respective Bz values used in the previous iteration to be considered a new orientation. An example of the criteria that may be used for determining whether or not the new sensor data is likely to correspond to a new orientation is as follows:

$$|Bz_{corrupted} - \widehat{Bz}_{corrupted}| > minBzDelta$$

$$|Bz_{reference} - \widehat{Bz}_{reference}| > minBzDelta$$

where minBzDelta is a configured threshold, 200 nT being a reasonable default value, $\widehat{Bz}_{corrupted}$ is mean of the corrupted Bz values used in the previous iteration, $\widehat{Bz}_{reference}$ is the mean of the reference Bz values used in the previous iteration, $Bz_{corrupted}$ is the new measurement of Bz from the corrupted sensor set, and $Bz_{reference}$ is the new measurement of Bz from the reference sensor set. When both of the above equations are true, it may be concluded that the new measurements of Bz correspond to a sufficiently different orientation such that the new measurements will improve the estimates of z axis magnetic scale factor and bias. The variance of the Bz of both the reference sensor data and corrupted sensor data may also be taken into account in the determination of whether or not the drill string has changed attitude sufficiently. In some such embodiments, RSS controller 103 may use a least squares method, such as linear least squares, iteratively reweighted least squares, or any other type of regression analysis, to solve for z-axis magnetic scale factor and bias of first sensor set 101a. The independent variables in such embodiments are Bz of the corrupted sensor data and a constant. The dependent variable is the estimate of theoretical Bz, which is referred to as $Bz_{reference}$. When linear least squares is utilized to solve for z-axis magnetic scale factor and bias of first sensor set 101a, the set of linear equations can be formulated as shown in the following equation:

$$\begin{bmatrix} Bz_{corrupted}[1] & 1 \\ Bz_{corrupted}[2] & 1 \\ \vdots & \vdots \\ Bz_{corrupted}[N] & 1 \end{bmatrix} \begin{bmatrix} scale_{Bz} \\ bias_{Bz} \end{bmatrix} = \begin{bmatrix} Bz_{reference}[1] \\ Bz_{reference}[2] \\ \vdots \\ Bz_{reference}[N] \end{bmatrix}$$

where $Bz_{reference}[k]$ is the $k^{th}$ estimate of the theoretical Bz, $Bz_{corrupted}[k]$ is the $k^{th}$ mean value of Bz from the corrupted sensor set 101a, $scale_{Bz}$ is the Bz scale factor being solved for, and $bias_{Bz}$ is the bias being solved for. In some embodiments, $Bz_{reference}$ may be obtained from z axis measurements from the reference second sensor data set 101b. In some embodiments, $Bz_{reference}$ may be obtained from the cross axis measurements of the corrupted sensor data ($Bcross_{corrupted}$), the estimate for cross-axis scale factor ($Bcross_{Scale}$), and a known, or estimated, total magnetic field strength ($Btotal_{reference}$) according to:

$$Bz_{reference} = \sqrt{(Btotal_{reference})^2 - (Bcross_{Scale} * Bcross_{corrupted})^2}$$

In some embodiments, $Bz_{reference}$ may be obtained from both of the embodiments described above or from any other method that may result in an estimate of Bz along with a measure of the uncertainty of Bz. In some embodiments, $Btotal_{reference}$ may be calculated from reference sensor set 101b.

In some embodiments, the known or estimated differences in orientation between the depth aligned reading of $Bz_{corrupted}$ and $Bz_{reference}$, may be used to calculate a correction to either $Bz_{corrupted}$ or $Bz_{reference}$. In some embodiments, such a correction may also utilize knowledge and/or measurements/estimations of the local magnetic field (Btotal and Bdip), local gravitational field (Atotal), azimuth of sensor set 101a, azimuth of sensors set 101b, or any combination thereof. One possible purpose of this correction is to account for the differences in orientation between the readings from sensor set 101a and sensor set 101b. The differences in orientation may be due, for example only and not limited to, inexact depth alignment and/or quantization of the readings to be aligned. In some embodiments, an assumption may be made that the difference in orientation is mainly an inclination difference, such as when drilling the curve of a wellbore. In such embodiments, the correction may be calculated according to:

$$Bz_{Diff} = \sin(Inc_{corrupted}) * \cos(Azi_{corrupted}) * B_{north} + \cos(Inc_{corrupted}) * B_{down} - \sin(Inc_{reference}) * \cos(Azi_{corrupted}) * B_{north} + \cos(Inc_{reference}) * B_{down}$$

Where $Inc_{corrupted}$ is the inclination of sensor set 101a, $Inc_{reference}$ is the inclination of second sensor set 101b, $Azi_{corrupted}$ is the azimuth of sensor set 101a, $Azi_{reference}$ is the azimuth of second sensor set 101b, and $B_{north}$ and $B_{down}$ are calculated according to:

$$B_{north} = B_{Total} * \cos(B_{Dip})$$

$$B_{down} = B_{Total} * \sin(B_{Dip})$$

Where $B_{Total}$ is the magnitude of earth's magnetic field, and $B_{Dip}$ is the angle of the earth's magnetic field with respect to horizontal. The calculated value for $Bz_{Diff}$ at each iteration may then be either subtracted from $Bz_{corrupted}$ added to $Bz_{reference}$ before being included in the set of linear equations.

In some embodiments, instead of augmenting the set of linear equations at each iteration, the covariance matrix of the independent variables and the cross-covariance between the independent variables and the dependent variables may be stored on RSS controller 103 for iterative updates to, for example and without limitation, save processor time and memory usage. In such an embodiment, the components stored can be used to solve for scale factor and bias according to the following, which is referred to as the normal equation:

$$\begin{bmatrix} \widehat{Bz}^2_{corrupted} & \widehat{Bz}_{corrupted} \\ \widehat{Bz}_{corrupted} & 1 \end{bmatrix} \begin{bmatrix} scale_{Bz} \\ bias_{Bz} \end{bmatrix} = \begin{bmatrix} \widehat{Bz}_{covariance} \\ \widehat{Bz}_{estimate} \end{bmatrix}$$

Where the hat symbol indicates estimations of the corresponding variable.

In some embodiments, updates to the components of the covariance matrix and the cross-covariance vector may be weighted based on estimations of the current solutions uncertainty and estimations of the uncertainty of the new set of measurements. In some embodiments, the uncertainty of the new set of measurements may be calculated based on estimations of the uncertainty of the corrupted Bz measurement from first sensor set 101a, and estimations of the uncertainty of the new estimates of Bz. In some embodiments, in which the new estimate of Bz is from second sensor set 101b, the estimation of the uncertainty of the new set of measurements may also be based on differences in inclination between the corrupted first sensor set 101a and the reference second sensor set 101b, differences in Bz between the corrupted first sensor set 101a and the reference second sensor set 101b, the variances of inclination from the corrupted first sensor set 101a, and the variances of inclination from the reference second sensor set 101b. In some embodiments, the estimate of the uncertainty of the new set of measurements may be calculated according to:

$$\sigma_{input}^2 = \sigma_{Bz_{corrupted}}^2 + \sigma_{Bz_{reference}}^2 + \text{WtIncorrupted} \ast \sigma_{inc_{corrupted}}^2 + \text{WtIncReference} \ast \sigma_{inc_{reference}}^2 + \text{WtDeltaInc} \ast (\text{Inc}_{corrupted} - \text{Inc}_{reference})^2$$

Where WtIncCorrupted, WtIncReference, and WtDeltaInc are set to positive values in order to provide similar magnitudes for the inclination variances as the Bz variances, as well as provide the ability to adjust the relative weighting between the various uncertainties. Values for WtIncCorrupted, WtIncReference, and WtDeltaInc may be any positive number, with reasonable values being between 10 and 1000, and 100 being used in some embodiments.

In some embodiments, in which Bzreference is calculate based on knowledge of the local magnetic field and the corrupted Bz measurement from first sensor set 101a, the estimation of the uncertainty of the new set of measurements may be calculated according to:

$$\sigma_{Input}^2 = \sigma_{Bz_{corrupted}}^2 + \frac{1}{Bz_{reference}^2} \ast \left( Btotal_{reference}^2 \ast \sigma_{Btotal_{reference}}^2 + Bcross_{corrupted}^2 \ast \sigma_{Bcross_{corrupted}}^2 \right)$$

The weighting to be applied to the new set of measurements may be calculated according to:

$$inputWeighting = \frac{\sigma_{Estimate}^2}{\sigma_{Estimate}^2 + \sigma_{Input}^2}$$

The weighting may be used to update the components of the covariance matrix and the cross-covariance vector according to:

$$\widehat{Bz}_{corrupted}^2 = \widehat{Bz}_{corrupted}^2 \ast (1 - inputWeighting) + inputWeighting \ast Bz_{corrupted}^2$$

$$\widehat{Bz}_{corrupted} = \widehat{Bz}_{corrupted} \ast (1 - inputWeighting) + inputWeighting \ast Bz_{corrupted}$$

$$\widehat{Bz}_{covariance} = \widehat{Bz}_{covariance} \ast (1 - inputWeighting) + inputWeighting \ast Bz_{corrupted} \ast Bz_{estimate}$$

$$\widehat{Bz}_{reference} = \widehat{Bz}_{reference} \ast (1 - inputWeighting) + inputWeighting \ast Bz_{reference}$$

Additionally, a quantification of the uncertainty, here denoted by $\sigma_{Estimate}^2$, of the adapted covariance matrix and the cross-covariance vector, may be updated according to:

$$\sigma_{Estimate}^2 = (1 - inputWeighting)^2 \ast \sigma_{Estimate}^2 + inputWeighting^2 \ast \sigma_{input}^2$$

In some embodiments, such as where drill string 20 is not changing attitude sufficiently from a prior iteration of the above calculations, Bz bias alone may be estimated. In some such embodiments, Bz bias may be estimated using an adaptive Kalman filter to track the difference between the Bz of the corrupted sensor data (corrected for scale factor only) and the Bz of the reference sensor data.

In some embodiments, the adaptive Kalman filter may be configured to estimate a single constant. The measurement covariance, R, and process covariance, Q, may be set based on, for example and without limitation, one minute estimates of variance for the reference sensor data Bz and the corrupted sensor data Bz. One or both of these parameters may, in some embodiments, be adjusted in-situ. In some embodiments, state estimate covariance may also be selected such that the adaptation rate is coordinated with the adaptation rate, inputWeighting. The variance of the current estimate for the scale factor and bias solution, $\sigma_{Estimate}^2$, may be used to calculate an upper bound for the state covariance, P, of the adaptive Kalman filter according to:

$$P = \min(P, \sigma_{Estimate}^2 \ast Pfactor)$$

where Pfactor is a configurable variable, with 3 being a typical value, and reasonable values being in the range of 1 to 5.

In some embodiments, reasonable bounds of the angle between the orientation of sensor set 101a and sensor set 101b are either predetermined or calculated in-situ. The reasonable bounds for orientation differences between the two sensor sets may be utilized to calculate reasonable bounds for the expected difference between the reference sensor set 101b readings and the corrected readings from sensor set 101a. In some embodiments, the inclination and azimuth calculated from corrected sensor set 101a readings may be used in combination with the readings from second sensor set 101b to calculate maximum and minimum thresholds for the differences between the corrected readings of sensor set 101a and sensor set 101b. In some such embodiments, the maximum and minimum thresholds may be calculated according to:

$$maxAziBend = \sqrt{\max(0, coneAngle^2 - (Inc_{reference} - Inc_{corrected})^2)}$$

$$Azi_{left} = Azi_{corrected} - maxAziBend$$

$$Azi_{right} = Azi_{corrected} - maxAziBend$$

$$Bz_{center} = \sin(Azi_{corrected}) \ast \cos(Azi_{corrected}) \ast B_{north} + \cos(Azi_{corrected}) \ast B_{down}$$

$$Bz_{left} = \sin(Inc_{reference}) \ast B_{north} \ast \cos(Azi_{left}) + \cos(Inc_{reference}) \ast B_{down}$$

$$Bz_{right} = \sin(Inc_{reference}) \ast B_{north} \ast \cos(Azi_{right}) + \cos(In c_{reference}) \ast B_{down}$$

$$DeltaBz_{min} = \min(Bz_{left} - Bz_{center}, Bz_{right} - Bz_{center})$$

$$DeltaBz_{max} = \max(Bz_{left} - Bz_{center}, Bz_{right} - Bz_{center})$$

Where $B_{north}$ and $B_{down}$ are the horizontal and vertical components of local gravity, coneAngle is the maximum angle determined to be possible between sensor set 101a and 101b, and $Azi_{corrected}$ is the calculated azimuth from the corrected sensor readings from sensor set 101a. $DeltaBz_{min}$ and $DeltaBz_{max}$ can then be used to determine the maximum and minimum threshold values for $Bz_{reference}$ according to:

$$MaxBz_{reference} = Bz_{reference} + DeltaBz_{max} + Bz_{margin}$$

$$MinBz_{reference} = Bz_{reference} - DeltaBz_{min} - Bz_{margin}$$

Where $Bz_{margin}$ is a configuration parameter, with a value of 50 nT being reasonable for some embodiments, and reasonable ranges being between 10 nT and 1000 nT. Similar bounds may be calculated for other readings, such as $B_{cross}$ and deltaMtfHtf. In some embodiments, the adaptation rates for the adapted parameters may be adjusted when one or more readings do not lie within their respective calculated bounds. In some embodiments, when this occurs, real-time notifications may be sent to the surface and/or to the closed loop controller indicating the identified condition. In some embodiments, any of the details or results of an in-situ compensation and control operation as described herein may be sent to the surface by any telemetry method known in the art. In some embodiments, one or more states or parameters of the in-situ compensation and control operation may be adjusted by commands sent from the surface by any telemetry method known in the art.

In some embodiments, RSS controller 103 may calculate the cross axis magnetic scale factor of the corrupted sensor data using the depth aligned reference sensor data and may adapt the estimated cross axis scale factor of the corrupted sensor data towards the estimated value (211). In some such embodiments, RSS controller 103 may use an IIR filter of the depth aligned Bcross of the reference sensor data as the estimate. In some embodiments, the estimated cross axis scale factor of the corrupted sensor data may only be adapted if the corrupted Bcross is above a threshold, such as, for example and without limitation, a value between 50 and 5000 nT.

In some embodiments, RSS controller 103 may use the updated estimates of z axis scale factor and bias and cross axis scale factor of the corrupted sensor data to correct the measurements from first sensor set 101a (213).

In some embodiments, RSS controller 103 may calculate an updated estimated azimuth based on at least one of the corrected measurements from first sensor set 101a (215). In some embodiments, the updated estimated azimuth may be calculated according to:

$$\text{Azimuth} = a\tan\left(\frac{\sin(deltaMtfHtfCorrected)}{\frac{BzCorrected}{BcrossCorrected}*\sin(\text{inclination})+\cos(\text{inclination})*\cos(deltaMtfHtfCorrected)}\right)$$

where deltaMtfHtfCorrected=MTF−HsTF+deltaMtfHtfBiasEstimate $Bz$Corrected=$Bz*Bz$Scale+$Bz$Bias BcrossCorrected=Bcross*BcrossScale Other embodiments may calculate an updated estimated azimuth using other formulas that utilize at least 1 of the corrected measurements of deltaMtfHtfCorrected, BzCorrected, or BcrossCorrected.

Thus, inaccuracies in determining the attitude of RSS 45 at the location of first sensor set 101a caused by the effects of magnetic interference proximate to first sensor set 101a may be reduced, and a more accurate azimuth may be determined.

In some embodiments, RSS controller 103 may calculate a change in estimated azimuth due to an update to the corrections of Bz, Bcross and deltaMtfHtf, thus separating the change in estimated azimuth due to updates to corrections from the change in azimuth due to estimated physical attitude change. In some embodiments, RSS controller 103 uses both the updated estimated azimuth and the updated change in estimated azimuth due to updates to corrections to adjust control of RSS 45 as described below.

Figure 5:
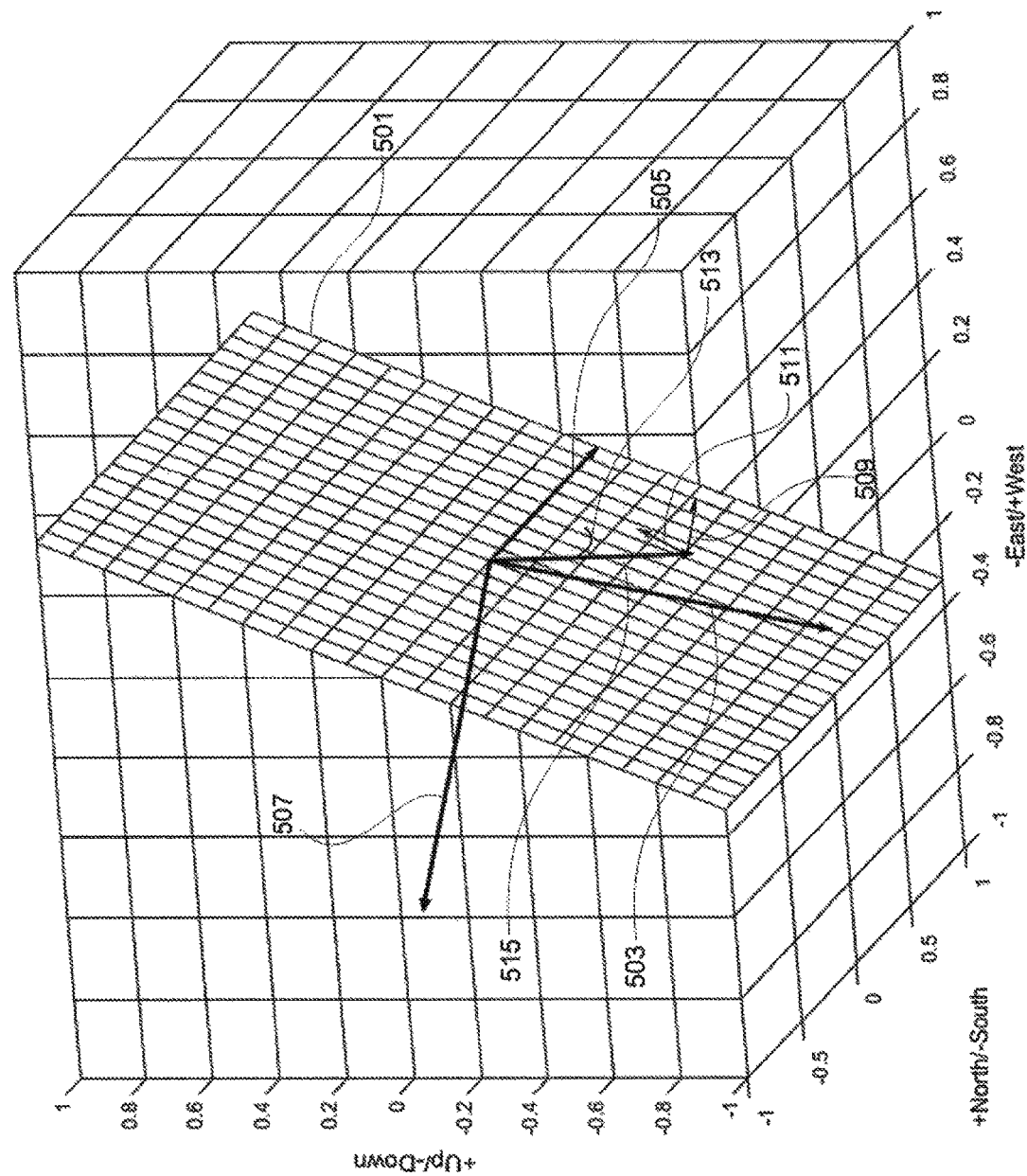
FIG. 5 depicts a schematic view of a steering operation of an RSS consistent with at least one embodiment of the present disclosure.

In some embodiments, RSS controller 103 may be used to control RSS 45, and may use the estimated azimuth or the estimated azimuth and the change in estimated azimuth due to updates to corrections to provide instructions to RSS 45 and thereby steer the propagation of wellbore 5 (217). In some such embodiments, a target plane control mode may be employed. Referring now to FIG. 5, in one embodiment of a target plane control mode, a control plane 501 may be defined by a starting attitude 503 and a target attitude 505 to drill towards and hold. In some embodiments, both the starting attitude 503 and target attitude 505 may be sent from the surface via a downlink message. In other embodiments, only the target attitude 505 may be sent from the surface via downlink and the starting attitude 503 determined by the estimated attitude of the tool at the time the target attitude downlink was received. Defining control plane 501 based on the downlinked target attitude 505 and estimated attitude at the time the downlink is received may reduce downlink transmission time and reduce wellbore tortuosity due to steering forces applied to correct for the attitude error between a downlink specified starting attitude and the estimated attitude at the time the downlink is received. In some embodiments, control plane 501 may be defined by its normal vector 507 which may be calculated according to:

controlPlaneNormal=startAttitude×targetAttitude where x denotes the vector cross product and startAttitude and targetAttitude are the starting attitude 503 and target attitude 505 vectors in North, East, Down earth coordinates and may be calculated according to:

$$startAttitude = \begin{bmatrix} \sin(startInclination)\cos(startAzimuth) \\ \sin(startInclination)\sin(startAzimuth) \\ \cos(startInclination) \end{bmatrix}$$

$$targetAttitude = \begin{bmatrix} \sin(targetInclination)\cos(targetAzimuth) \\ \sin(targetInclination)\sin(targetAzimuth) \\ \cos(targetInclination) \end{bmatrix}$$

Once a control plane is defined, RSS controller 103 may separate steering forces into two orthogonal components, a to-plane steering force 509 in the direction normal to control plane 501 and a to-target steering force 511 parallel to control plane 501 and in the direction of target attitude 505.

In some embodiments, RSS controller 103 may operate autonomously down-hole on the to-plane steering force 509 by employing a single axis attitude controller with the error input 513 being the angle between the estimated attitude 515 obtained from the estimated inclination and azimuth and control plane 501 and the output being the to-plane steering force 509 applied by RSS 45 normal to control plane 501. In such embodiments, the attitude control law applied may, for example and without limitation, be determined by a PID, PID with leaky integrator, PID with leaky integrator and integrator dead zone, parameter adaptive, non-parametric adaptive, model reference adaptive, or other control law known in the art. In some such embodiments, the to-plane controller error input 513 may be calculated according to:

$$errorAngleToPlane =$$
$$\cos^{-1}\left(\frac{controlPlaneNormal \cdot estimatedAttitude}{\|controlPlaneNormal\| \|estimatedAttitude\|}\right) - 90°$$

where · denotes the dot product, $\| \|$ denotes the vector magnitude or L2 norm, and estimatedAttitude is the estimated attitude 515 vector which can be calculated from the updated estimated azimuth and inclination according to:

$$estimatedAttitude = \begin{bmatrix} \sin(\text{inclination})\cos(\text{Azimuth}) \\ \sin(\text{inclination})\sin(\text{Azimuth}) \\ \cos(\text{inclination}) \end{bmatrix}$$

In some embodiments, RSS controller 103 may adjust the control plane in response to an update to corrections of Bz, Bcross and deltaMtfHtf. In some such embodiments, RSS controller 103 may mathematically rotate the control plane about the target attitude vector so that the error angle to the plane does not include any error due to the updated corrections, and thus avoid steering force corrections due to the correction updates which may undesirably introduce increased wellbore tortuosity. In some such embodiments, the control plane rotation angle about the target vector may be calculated according to:

$$rotationAngle = \frac{errorAngleToPlanePrior - errorAngleToPlane}{\sin(errorAngleInPlanePrior)}$$

where errorAngleToPlane is the error angle to the control plane with updated estimated azimuth with the most recent corrections, errorAngleToPlanePrior is the error angle to the control plane with the updated estimated azimuth calculated with the prior corrections and errorAngleInPlanePrior is the angle between the target attitude and the projection of the attitude vector obtained using the updated estimated azimuth calculated with the prior corrections onto the control plane, all of which may be calculated according to:

$$errorAngleInPlanePrior =$$
$$\cos^{-1}\left(\frac{[controlPlaneNormal \times (estimatedAttitudePrior \times controlPlaneNormal)] \cdot targetAttitude}{\|controlPlaneNormal \times (estimatedAttitudePrior \times controlPlaneNormal)\| \|targetAttitude\|}\right)$$

$$errorAngleToPlanePrior =$$
$$\cos^{-1}\left(\frac{controlPlaneNormal \cdot estimatedAttitudePrior}{\|controlPlaneNormal\| \|estimatedAttitudePrior\|}\right) - 90°$$

where estimatedAttitudePrior is the attitude vector calculated from the estimated Azimuth using the prior deltailMtfHtfCorrected, BzCorrected and $B_{cross}$Corrected. In such embodiments, the control plane may be rotated about rotationAngle according to the following calculations:

$$controlPlaneNormal_i = RM * controlPlaneNormal_{i-1}$$

where $controlPlaneNormal_i$ is the rotated control plane used in the present iteration and $controlPlaneNormal_{i-1}$ is the non-rotated control plane normal from the prior iteration and RM is the rotation matrix which may be calculated according to:

$$RM = \cos(\text{rotationAngle})*1 + \sin(\text{rotationAngle})*[\text{targetAttitude}]_x + (1-\cos(\text{rotationAngle})) *\text{targetAttitude}*\text{targetAttitude}^T$$

where I is the identity matrix, $[\text{targetAttitude}]_x$ denotes the cross product matrix of the target attitude vector and targetAttitude$^T$ denotes the transpose of the target attitude vector. The cross product matrix of the target attitude vector may be constructed according to:

$$[targetAttitude]_X =$$
$$\begin{bmatrix} 0 & -targetAttitude_D & targetAttitude_E \\ targetAttitude_D & 0 & -targetAttitude_N \\ -targetAttitude_E & targetAttitude_N & 0 \end{bmatrix}$$

where $targetAttitude_N$, $targetAttitude_E$, and $targetAttitude_D$ correspond to the North, East and Down components of the target attitude vector described above. In some such embodiments, RSS controller 103 may calculate a 3D angle difference between the estimated attitude utilizing the corrections from the current update and prior update and rotate the control plane only when the 3D angle difference exceeds a particular value so that smaller corrections resulting in less wellbore tortuosity are immediately accounted for which may result in reduced 3D wellbore path error. In such embodiments, the 3D angle difference may be between 0.1 deg and 0.5 deg. In other embodiments, RSS controller 103 may adjust the control plane in response to an update to corrections of Bz, Bcross and deltaMtfHtf by applying the updated corrections to the uncorrected Bz, Bcross and deltaMtfHtf stored at the time the target attitude downlink was received, calculating an updated starting attitude from the corrected Bz, Bcross and deltaMtfHtf values, and calculating an updated control plane based on the updated starting attitude.

In a further aspect of an embodiment of a target plane control mode, to-target steering force 511 applied by RSS 45 in the direction parallel to the control plane in the direction of the target attitude control the turn rate towards the target attitude. In some embodiments, the to-target steering force 511 may be determined by an operator and sent manually via downlink from the surface to RSS controller 103. In other embodiments, turn rate per along-hole depth within the target plane may be specified by the operator and used as the set point in a turn rate controller which regulates to-target steering force 511 to achieve a desired turn rate towards the target attitude. In some embodiments of a turn rate controller, the desired turn rate may be downlinked from surface to RSS controller 103 which may operate autonomously downhole to adjust to-target steering force 511 applied by RSS 45 parallel to the control plane to achieve the desired turn rate towards the target attitude. In such an embodiment, RSS controller 103 may estimate the turn rate towards the target, for example and without limitation, by projecting the estimated attitudes from first sensor set 101a and second sensor set 101b onto the control plane and dividing the angle between the projections by the distance between first sensor set 101a and second sensor set 101b. RSS controller 103 may then compare the estimated turn rate to the desired turn rate and adjust to-target steering force 511 applied by RSS 45 parallel to the control plane to achieve the desired turn rate. Since wellbore 5 will only change attitude as drilling progresses, RSS controller 103 may calculate an updated estimate of turn rate towards the target only after detecting that drilling has occurred for a minimum time period, where the minimum time period may be between 30 sec and 3 min. Methods for detecting drilling may include, for example and without limitation, comparing down-hole measured lateral vibration, axial vibration, weight on bit, torque on bit, angular acceleration or any combination thereof to pre-defined thresholds. In some embodiments, the range of to-target steering force 511 autonomously adjusted by RSS controller 103 may be limited. In some embodiments the force may be limited to a pre-defined range, for example and without limitation, +−15% about a nominal force theoretically expected to achieve the desired turn rate. In embodiments incorporating autonomous down-hole turn rate control, communication of data between the surface and RSS controller 103 may be minimized, allowing, for example and without limitation, more rapid control corrections and more accurate placement of wellbore 5 by RSS 45. In other embodiments, the turn rate controller may be implemented in a surface computing system. In such embodiments, the surface computing system may estimate turn rate periodically by dividing the angle difference between the estimated wellbore attitude transmitted by downhole attitude correction and control system 100 through telemetry apparatus 111 obtained at two different depths by the difference in depths. The surface computing system may then compare the estimated turn rate to the desired turn rate and calculate an adjustment to to-target steering force 511 to achieve the desired turn rate which may be transmitted via downlink to RSS controller 103. In such an embodiment, the downlink may be triggered automatically or the operator may be prompted to perform the downlink manually. In other embodiments, surface estimated turn rate may periodically be downlinked and RSS controller 103 may merge down-hole and surface determined estimates of turn rate via a Kalman filter or other similar optimal or adaptive estimation method to obtain the estimate of turn rate used by the turn rate controller. In some embodiments, a model of the expected turn rate as a function of steer force may be used by the turn rate controller, whether located up-hole or downhole, to improve the accuracy of the adjustment of the steer force to achieve the desired turn rate. In some such embodiments, the model may be non-parametric and may be adapted based on past measurement of turn rate per steer force. In other such embodiments, the model may be parametric and may be dependent, for example and without limitation, on parameters such as weight on bit, RSS 45 attitude, bit condition, the turn rate of wellbore 5 directly above RSS 45. In other embodiments of a turn rate controller, the surface system may periodically downlink the along-hole depth of drill bit 30 measured at the surface by use of a draw-works encoder or other depth measurement device to RSS controller 103 which may then calculate the turn rate as the difference in angle between the estimated wellbore attitudes divided by the difference in depths.

Figure 6:
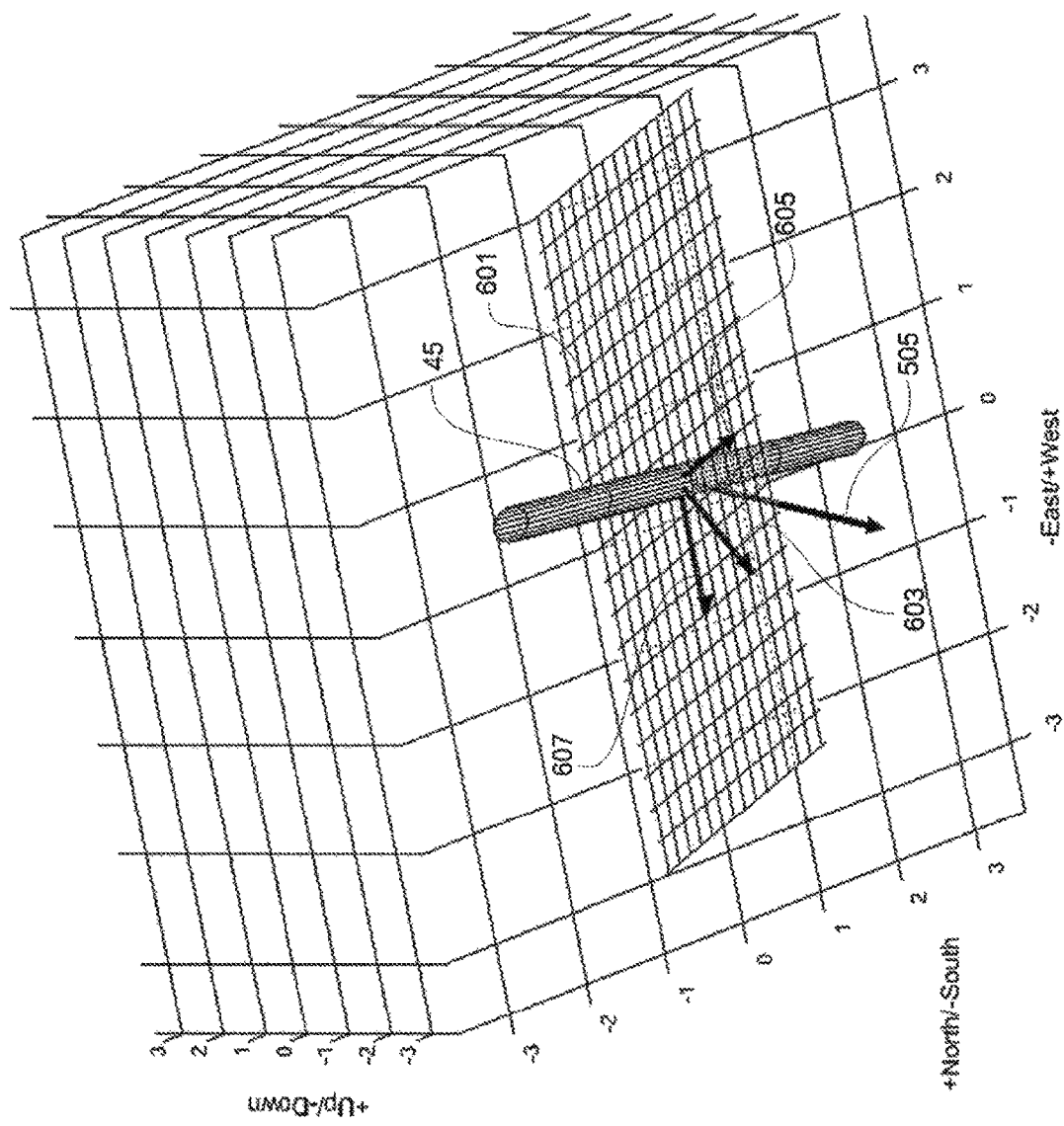
FIG. 6 depicts a schematic view of a steering operation of and RSS consistent with at least one embodiment of the present disclosure.

When RSS 45 nears the target attitude, RSS controller 103 may automatically exit the target plane control mode described above and enter a target hold mode. Determining when RSS 45 is near the target attitude may be accomplished by projecting the tool attitude vector onto the control plane and determining if the error angle between the projection and the target attitude is below a threshold where the threshold may be, for example and without limitation, a value between 0.1 deg and 10 deg. Now referring to FIG. 6, in one exemplary embodiment of a target hold mode, RSS controller 103 may project the target attitude vector 505 onto the cross-borehole plane 601 of RSS 45 periodically. The period may be 1 sec but could reasonably be between 0.1 sec and 10 sec depending on processing capability available and expected ROP. At each periodic update of the target hold mode, the estimated attitude vector with respect to earth North, East and Down coordinates may be determined from the estimated inclination and azimuth as [sin(Inclination)*cos(Azimuth); sin(Inclination)*sin(Azimuth); cos(Inclination)]. The target attitude vector in NED earth coordinates, which may be determined in like fashion, may then be vector projected (603) onto the cross-borehole plane 601 to determine a desired steering direction. In one embodiment, the cross-borehole plane 601 may be separated into to orthogonal components and separate controllers employing a PID or other similar control law may operate on their respective components of the projected target vector to determine the orthogonal components of a correcting steering force applied by RSS 45 required to maintain the target attitude.

For both the target plane control mode and target hold control modes described above, RSS controller 103 may define the cross-borehole plane Y axis 605 and cross-borehole plane X axis 607 with respect to any of the earth's fixed fields in order to reference the steering direction to the desired field. For example, when defining a steering direction with respect to the earth's gravity field, the Y axis may be defined to be in-line with the projection of the earth's gravity field onto the cross-borehole plane of the system and the X axis mutually orthogonal to the Y and Z axis where the Z axis is defined down the along-borehole axis. When defining a steering direction with respect to the earth's magnetic field, the Y axis may be defined to be in-line with the projection of the earth's magnetic field onto the cross-borehole plane of the system and the X axis mutually orthogonal to the Y and Z axis where the Z axis is defined down the along-borehole axis. When defining a steering direction with respect to the earth's rotation vector (true north), the Y axis may be defined to be in-line with the projection of the earth's rotation vector onto the cross-borehole plane of the system and the X axis mutually orthogonal to the Y and Z axis where the Z axis is defined down the along-borehole axis. In some embodiments a target steering direction may be determined by a weighted sum of the gravity and magnetic referenced directions where the weights are determined by a function of inclination or a function of the measured cross-borehole gravity and/or magnetic field magnitudes. In other embodiments, weights may be determined as a function of estimates of uncertainty of the gravity, magnetic or gyro measurements used to determine the direction.

In some embodiments, a target steering direction and force may, alternatively, be sent from the surface to the downhole system and used by RSS controller 103 to set the force applied by RSS 45 to propagate the path of wellbore 5 in the desired direction. In some such embodiments, the steering direction and force may be determined manually by an operator by using the estimated tool attitude as described above and along-hole measured depth to determine an error of the wellbore 5 from the desired wellbore path. In other embodiments, the steering direction and force may be determined automatically by a surface computing system by using the estimated tool attitude and along-hole measured depth to determine an error of the wellbore 5 from the desired wellbore path. In such embodiments, the determined steering direction and force may automatically trigger a downlink or, alternatively, be recommended to the operator. In other embodiments, the steering force applied in only the horizontal axis of the down-hole controller may be sent from the surface to the downhole system and may be determined and sent in a manner similar to the target steering direction and force.

In some embodiments, RSS controller 103 may incorporate one or more automated course correction sequences which may further reduce the number and frequency of downlinks required to correct wellbore 5 to the desired well path. In some such embodiments where RSS controller 103 is operating according to target hold control mode described above at the start of the course correction operation, RSS controller 103 may execute an automated course correction sequence in response to a course correction downlink sent from the surface system. In such embodiments, when a course correction downlink is received, RSS controller 103 may store the original target attitude in memory and enter target plane control mode with a temporary target attitude and direct RSS 45 to apply a correcting steer force parallel to the control plane and force normal to the plane as previously described until the temporary target attitude is reached. Once the temporary target attitude is reached, RSS controller 103 may then automatically set the target attitude back to the original target attitude and continue drilling towards the target attitude using target plane control mode as previously described using the correcting steer force. In some embodiments, the course correction downlink may specify the temporary target attitude directly. In other embodiments, the course correction downlink may specify a steering direction and angle relative to the current estimate of tool attitude from which the temporary target attitude is calculated by RSS controller 103 which may reduce the number of possibilities and therefore transmission time compared to specifying the temporary target attitude directly. In some embodiments, the course correcting downlink may specify the correcting steer force directly. In other embodiments, the course correcting downlink may specify a DLS which RSS controller 103 uses to determine the correcting steer force parallel to the plane in an automated manner using any of the previously described methods.

In another automated course correction sequence embodiment, where RSS controller 103 is operating according to target plane control mode at the start of the course correction operation, RSS controller 103 may apply a course correcting adjustment to the control plane by rotating the control plane about the vector lying in the original control plane and perpendicular to the target attitude vector by a specified angle. In such an embodiment, a downlink from surface may be sent specifying the rotation angle and correction force to be applied normal to the rotated control plane. RSS controller 103 may then proceed in target plane control correction mode, directing RSS 45 to apply the previously indicated force parallel to the plane and the newly specified correction force normal to the plane until the tool attitude is determined to be substantially one the plane. Once RSS controller 103 determines that the tool attitude is substantially on the rotated control plane, the original control plane is restored and RSS controller 103 continues in target plane control correction mode, directing RSS 45 to apply the previously indicated force parallel to the restored original control plane and the correction force normal to the restored original control plane until the tool attitude is substantially on the original control plane. Once RSS controller 103 determines that the tool attitude is substantially on the original control plane, RSS controller 103 exits target plane control correction mode and re-enters target plane control mode with the original parameters.

For the automated course correcting sequence methods described above, in some embodiments the parameters of the course correcting downlink are determined by an operator and the downlink is sent manually. In other embodiments, the parameters of the course correcting downlink are determined automatically by a surface computing system to achieve the desired displacement of the wellbore to substantially align the wellbore with the desired well path. In such embodiments, the determined parameters may be recommended to the operator or sent via an automatically triggered downlink. In other embodiments, along-hole depth may be periodically downlinked to RSS controller 103 which may then determine the parameters of the course correcting sequence down-hole.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the scope of the present disclosure and that they may make various changes, substitutions, and alterations herein without departing from the spirit and scope of the present disclosure.

The invention claimed is:

1. A method comprising:
    providing a Bottom Hole Assembly (BHA) positioned in a wellbore, the BHA comprising:
        a rotary steerable system; and
        a RSS controller for controlling the rotary steerable system, the RSS controller having a target hold mode, the target hold mode comprising:
            determining the cross-borehole plane of the rotary steerable system;
            projecting a target attitude vector onto a cross-borehole plane of the rotary steerable system wherein the cross-borehole plane is separated into orthogonal components, and separate controllers each employing a Proportional Integral Derivative control operates on their respective components of a projected target vector to determine the orthogonal components of a correcting steering force applied to the rotary steerable system to maintain a target attitude; and
            using the projected target attitude vector to determine a desired steering direction.

2. The method of claim 1, wherein the RSS controller further includes a target plane control mode.

3. The method of claim 2, wherein the RSS controller transitions from a target plane control mode into target hold mode when the rotary steerable attitude is detected to be within a defined angle of the target attitude.

* * * * *